(12) United States Patent
Thakore et al.

(10) Patent No.: US 11,706,038 B1
(45) Date of Patent: *Jul. 18, 2023

(54) SYSTEM AND METHOD FOR DISTRIBUTED PKI ROOT

(71) Applicant: Cable Television Laboratories, Inc., Louisville, CO (US)

(72) Inventors: Darshak Thakore, Broomfield, CO (US); Michael Glenn, Golden, CO (US); Brian Alexander Scriber, Lafayette, CO (US); Steven John Goeringer, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,967

(22) Filed: Jul. 18, 2022

Related U.S. Application Data

(63) Continuation of application No. 17/101,704, filed on Nov. 23, 2020, now Pat. No. 11,394,564, which is a continuation of application No. 15/935,533, filed on Mar. 26, 2018, now Pat. No. 10,848,322.

(60) Provisional application No. 62/476,365, filed on Mar. 24, 2017.

(51) Int. Cl.
*H04L 9/32* (2006.01)
*H04L 9/00* (2022.01)

(52) U.S. Cl.
CPC .......... *H04L 9/3268* (2013.01); *H04L 9/006* (2013.01); *H04L 9/3239* (2013.01); *H04L 9/50* (2022.05); *H04L 2209/56* (2013.01)

(58) Field of Classification Search
CPC . H04L 2209/38; H04L 2209/56; H04L 9/006; H04L 9/3239; H04L 9/3268
See application file for complete search history.

(56) References Cited

U.S. PATENT DOCUMENTS

| | | | | |
|---|---|---|---|---|
| 10,361,869 B2* | 7/2019 | Gorman | .................. | H04L 9/321 |
| 10,521,623 B2* | 12/2019 | Rodriguez | ............ | H04L 9/0861 |
| 10,594,484 B2* | 3/2020 | Rodriguez | ............ | H04L 9/0861 |
| 10,673,636 B1* | 6/2020 | Finke | ..................... | H04L 9/3247 |
| 10,848,301 B1* | 11/2020 | Fregly | ................. | H04L 61/4511 |
| 11,394,564 B1* | 7/2022 | Thakore | ............... | H04L 9/3239 |
| 11,522,849 B2* | 12/2022 | Honjo | ................... | H04L 9/3263 |
| 11,539,787 B2* | 12/2022 | Shaw | ..................... | H04L 67/10 |

(Continued)

*Primary Examiner* — Gary S Gracia
(74) *Attorney, Agent, or Firm* — Josh C. Snider

(57) ABSTRACT

A public key infrastructure (PKI) ecosystem includes a first organization computer system having a first processor, a first memory, and a first organization process including instructions that are (i) encoded in the first memory, and (ii) executable by the first processor. The ecosystem further includes a second organization computer system having a second processor and a second memory, a digital ledger, and domain name system security extensions (DNSSEC). When executed, the first instructions cause the first processor to create at least one public/private PKI keypair for a first domain name, in the DNSSEC, register the first domain name and create a certificate authority (CA), register the CA in the blockchain, using the CA, create a certificate for a first entity, register the certificate in the blockchain and/or the DNSSEC, and assert, to the second organization computer system, trust in the first entity based on the registered certificate.

20 Claims, 2 Drawing Sheets

(56) References Cited

U.S. PATENT DOCUMENTS

| | | | |
|---|---|---|---|
| 2006/0143442 A1* | 6/2006 | Smith | H04L 9/3271 |
| | | | 713/156 |
| 2013/0262860 A1* | 10/2013 | Lamb | H04L 9/321 |
| | | | 713/156 |
| 2016/0191243 A1* | 6/2016 | Manning | H04L 61/4511 |
| | | | 713/168 |
| 2017/0012780 A1* | 1/2017 | Kaliski, Jr. | H04L 61/4552 |
| 2017/0012943 A1* | 1/2017 | Kaliski, Jr. | H04L 61/4552 |
| 2017/0236123 A1* | 8/2017 | Ali | G06Q 20/3825 |
| | | | 705/75 |
| 2017/0272250 A1* | 9/2017 | Kaliski, Jr. | H04L 61/4511 |
| 2017/0279617 A1* | 9/2017 | Blinn | H04L 63/06 |
| 2017/0338967 A1* | 11/2017 | Lewison | H04L 9/3268 |
| 2017/0346639 A1* | 11/2017 | Muftic | H04L 9/3247 |
| 2018/0034827 A1* | 2/2018 | Kaliski, Jr. | H04L 63/126 |
| 2018/0062848 A1* | 3/2018 | Gorman | H04L 9/3239 |
| 2018/0278427 A1* | 9/2018 | Thakore | H04L 9/006 |
| 2019/0333054 A1* | 10/2019 | Cona | G06Q 20/383 |
| 2020/0021446 A1* | 1/2020 | Roennow | H04L 63/1458 |
| 2020/0127965 A1* | 4/2020 | Oron | G06F 16/1805 |
| 2021/0351940 A1* | 11/2021 | Aschauer | H04L 9/3268 |
| 2022/0103370 A1* | 3/2022 | Alwen | H04L 9/30 |

* cited by examiner

SYSTEM AND METHOD FOR DISTRIBUTED PKI ROOT

CROSS REFERENCE TO RELATED APPLICATIONS

This application is a continuation of U.S. patent application Ser. No. 17/101,704, filed Nov. 23, 2020, which is a continuation of U.S. patent application Ser. No. 15/935,533, filed Mar. 26, 2018, now U.S. Pat. No. 10,848,322, issued Nov. 24, 2020, which application claims the benefit of and priority to U.S. Provisional Patent Application Ser. No. 62/476,365, filed Mar. 24, 2017, which applications are incorporated herein by reference in their entireties.

BACKGROUND

The field of the disclosure relates generally to management of device registration, and more particularly, to management of public and private keys and/or certificates through distributed ecosystems.

Many conventional electronic devices utilize a Public Key Infrastructure (PKI) to validate electronic signatures in a variety of technology fields, such as telecommunications (e.g., mobile communication devices), the Internet of Things (IoT), online banking, secure email, and e-commerce. PKI uses a pair of cryptographic keys (e.g., one public and one private) to encrypt and decrypt data. PKI implementation enables obtaining and renewal of X.509 certificates, which are used to establish trust between ecosystem elements, including, for example, devices. PKI conventionally encrypts communications using protocols such as Transport Layer Security (TLS), etc. A PKI typically includes policies and procedures for encrypting public keys, as well as the creation, management, distribution, usage, storage, and revocation of digital certificates. The PKI binds the public keys to the identity of a person or legal entity, which is typically managed through a trusted Certificate Authority (CA). The PKI hierarchy identifies a chain of trust for a device, program, or other ecosystem elements, and may also provide secure software download requirements and/or secure certificate injection requirements throughout the PKI ecosystem, over which CAs, parties/participants, programs, devices, manufacturers, etc. interact.

A significant problem that is encountered with conventional PKI ecosystems is the requirement that a central authority/root of trust must be provisioned, or must be known by the endpoints of the ecosystem that want to verify a given identity. These requirements result in limitations on the scalability of the ecosystem, and further cause supply chain problems. As a result, PKIs have only been implemented in limited, controlled ecosystems. Additionally, most conventional PKI ecosystems include multiple independent Root CAs that participate in the ecosystem (e.g., the Web PKI). In such cases, all endpoints must have a list of all the participating Root CAs, which is further limiting on the ecosystem. Another known problem with conventional PKI ecosystems is that conventional CA-level certificates are created to be used for significant lengths of time (e.g., up to 50 years or more), but these a lengthy terms introduce significant security risks if the certificates become compromised due to the difficulty of issuing CA-level certificates. Furthermore, conventional CA certificates solutions cannot be renewed; instead, new CA certificates must be issued along with all relevant dependent certificates.

Most conventional PKI mechanisms depend on Domain Name System Security Extensions (DNSSEC) but only for specific use cases. These conventional mechanisms do not allow bootstrapping, nor do they enable the building of a trusted set of Root CAs using consensus, which can be cryptographically verified on a digital or distributed ledger, such as a blockchain, for example. As with of the overall conventional PKI ecosystems, above, these conventional PKI mechanisms also suffer from being required to set up one or more trusted Root CAs, thereby further rendering it difficult to implement PKI in many ecosystems. Accordingly, it is desirable to have a PKI mechanism that may be implemented in a PKI ecosystem without requiring the a priori setup of one or more Root CAs.

BRIEF SUMMARY

In an embodiment, a public key infrastructure (PKI) ecosystem includes a first organization computer system having a first processor, a first memory, and a first organization process. The first organization process includes instructions that are (i) encoded in the first memory, and (ii) executable by the first processor. The ecosystem further includes a second organization computer system having a second processor and a second memory, a digital ledger, and domain name system security extensions (DNSSEC). When executed, the first instructions cause the first processor to create at least one public/private PKI keypair for a first domain name, in the DNSSEC, register the first domain name and create a certificate authority (CA), register the CA in the blockchain, using the CA, create a certificate for a first entity, register the certificate in at least one of the blockchain and the DNSSEC, and assert, to the second organization computer system, trust in the first entity based on the registered certificate.

In an embodiment, a method is provided for verifying a public key infrastructure (PKI) certificate. The method is implemented by a first endpoint holding a first certificate, where the first endpoint seeks to verify a second certificate held by a second organization. The method uses domain name system security extensions (DNSSEC) and a digital ledger, and comprising steps of resolving a DNSSEC record of the second organization, retrieving a most recent CA public key of the second organization, querying the digital ledger to verify that the retrieved most recent CA public key has not expired, verifying that the second certificate has been signed by the retrieved most recent CA public key, utilizing at least one of an online certificate status protocol (OCSP) service and a certificate revocation list (CRL) service that is specified in one of the first and second certificates, and storing the retrieved most recent CA public key in the memory device associated with the first endpoint.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
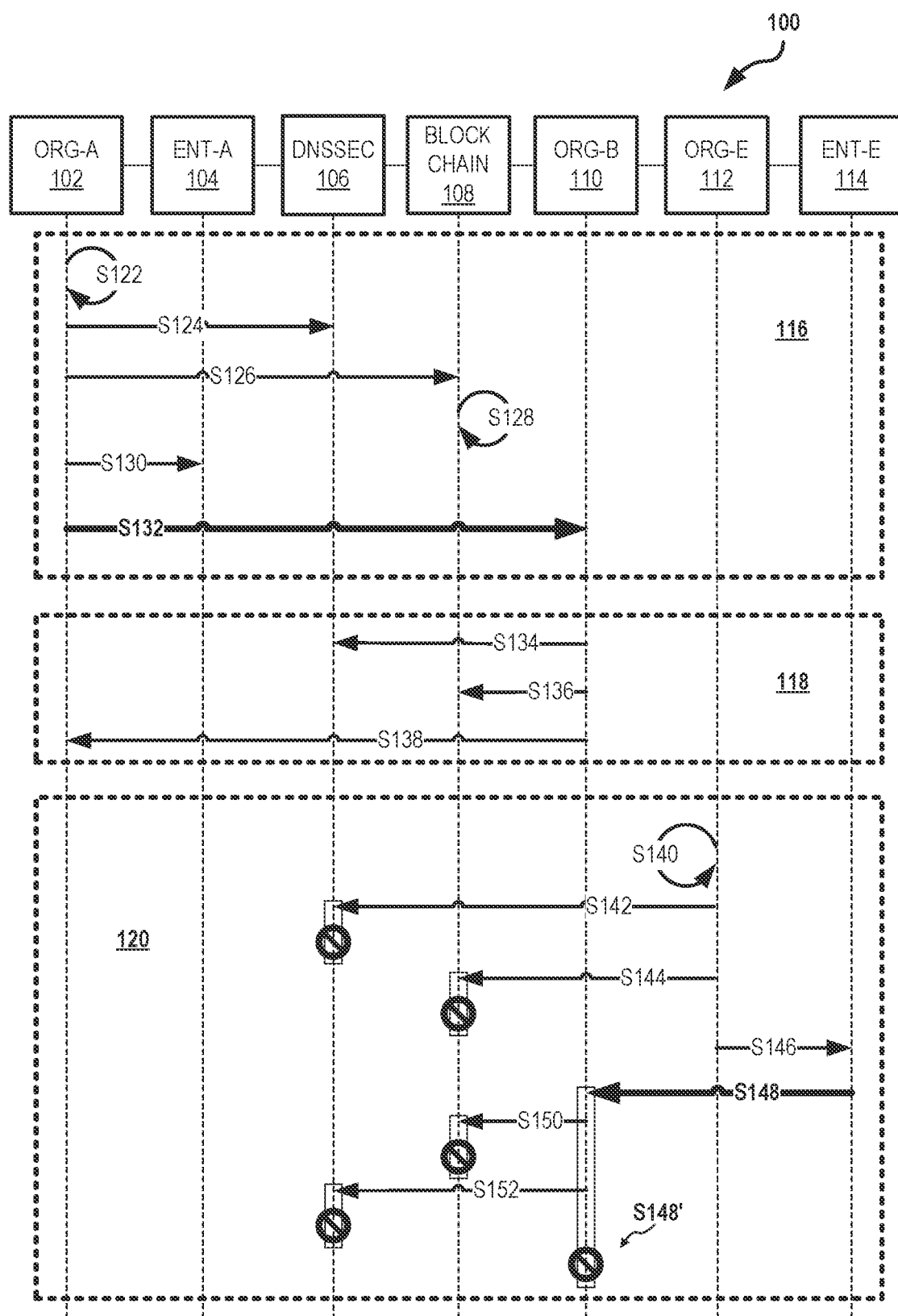
FIG. 1 is a sequence diagram for an exemplary PKI ecosystem, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, unless otherwise stated, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used further herein, "DNSSEC" refers to a Domain Name System Security Extension or Extensions. DNS SEC includes a suite of specifications for securing types of information provided by the domain name system (DNS) as used in Internet protocol (IP) networks (e.g., the Internet). DNS SEC protects applications, and caching resolvers (i.e., clients) serving such applications) backspace, from using forged or manipulated data. DNSSEC digitally signs information, and a DNS resolver is able to check such digital signatures to verify if received information is identical, unmodified, and/or complete with respect to other data served on an authoritative DNS server.

The present systems and methods herein advantageously utilize distributed ledgers to confirm and/or record the status of a PKI certificate. The present embodiments may be implemented to augment or, in some circumstances, replace conventional certificate registration and verification practices that rely on trusted parties to record events. The distributed ledgers described and illustrated herein may include, for example, blockchain technology to create digital ledgers for tracking the status of PKI certificates, as well as other information in the PKI ecosystem. For ease of explanation, the following description references blockchains as an exemplary embodiment of distributed ledger technology. A person of ordinary skill in the art though, upon reading and comprehending the present description and associated illustrations, will understand that other examples of distributed ledger technologies may be implemented according to the innovative and advantageous techniques and principles described herein.

That is, in the following disclosure, the phrases "distributed ledger" and "blockchain" are used. In conventional practice literature, these concepts are often considered to be synonymous. However, within this disclosure, these concepts may further differ in terms of their respective use and implementation. For example, in some instances the phrase "distributed ledger" may refer to how the ledger or blockchain is used, namely, the accessible distributed ledger as available to prove the facts of a transaction by virtue of being distributed amongst a consensus pool. A "blockchain," on the other hand, may refer to the technological process by which the distributed ledger is created and operated. Accordingly, a blockchain will create a distributed ledger, but a distributed ledger may also be created by other technology types. In the following description, the phrase "digital ledger" refers to either or both of the distributed ledger and the blockchain.

The present solutions are thus advantageously implemented as either standalone systems, or as complementary systems to conventional systems that rely on trusted parties two record events into databases or other record keeping mechanisms, often using trusted labels. In such systems, it is important to track and verify information (e.g., time, location, duration, number, status, etc.) through the ecosystem.

According to the embodiments herein, digital ledgers are implemented to create secure and immutable records of transactions regarding the creation or status of PKI certificates. In these records, the transaction information is encoded into formats, digitally signed using a cryptographic technique, and submitted to a network of processors of a distributed ledger network. The processors validate the submitted transactions for accuracy, and the validated transactions are subsequently added to a queue or stack of the ledger. At some point, according to a predetermined criterion (such as, but not limited to, an interval of time, a volume of data, a number of transactions, or combination of these and/or other factors), the queued or stacked transactions are sequentially hashed (e.g., using a Merkle process), and collectively encoded into a block which is then hashed with the hash of the proceeding block using cryptographic processes. An algorithm will allow multiple processors to select a block from amongst many processors to be the block added to the blockchain.

In an exemplary the embodiments described further herein, the distributed ledger utilizes a blockchain and/or blockchain technology. Blockchaining technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained. Exemplary systems and methods of blockchain technology are described in greater detail in co-pending U.S. patent application Ser. No. 15/345,411, filed Nov. 7, 2016, U.S. patent application Ser. No. 15/376,375, filed Dec. 12, 2016, U.S. patent application Ser. No. 15/476,111, filed Mar. 31, 2017, and U.S. patent application Ser. No. 15/476,098, filed Mar. 31, 2017, all of which are incorporated by reference herein.

As described herein, details of transaction events (e.g., current status, changes in status) for a particular PKI certificate are encoded into a cryptographically-signed and protected transaction that is submitted to a distributed ledger network, such as a blockchain network, for further processing. Processors of the distributed network process the incoming transactions into blocks, which may then be added to a particular blockchain. Once added to the blockchain (or equivalent entry in an electronic distributed ledger), the transaction is visible to, but immutable by, appropriate ecosystem participants or parties that seek to create a history of disposition and status of the PKI certificate. Such histories may then be more easily verified on the ledger, while being rendered more difficult to alter once added to the ledger. In some embodiments, the ledgers are configured to also track identities of ecosystem endpoints and participants.

The systems and methods described herein implement PKI solutions for the case where endpoints do not need to a priori include or know about a Root CA. In the exemplary embodiment, a central Root CA may be completely avoided. The present embodiments instead unable certificate validation based on a distributed, on-the-fly discovery of an issuing CA that is part of a peer-to-peer chain of trust. In some embodiments, in order to assure the validity of a particular CA, a governance body may be further implemented with one or more of the following embodiments to vet participation in the peer community, for example, by granting ownership of domains by DNS SEC.

In an exemplary embodiment, DNSSEC is leveraged as a registry for trust, and also to bootstrap trust. Additionally, digital ledgers/blockchains are leveraged to publish and manage the list of trusted CAs, including recycling/revocation. In some embodiments, consensus-based voting it is implemented to "untrust" specific CA certificates, which may be performed in addition to conventional certificate validation mechanisms. According to the exemplary embodiment, a novel blockchain resolver provides high performance verification of CA certificates. In addition to these innovations, the systems and methods described herein may be further configured to leverage such conventional certificate validation mechanisms as ACME, JOSE, Certificate Transparency (CT), in addition to other known certificate validation mechanisms.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. In some embodiments, the CA is further configured to be responsible for maintaining up-to-date revocation information regarding the validity of issued certificates, and will provide information to other ecosystem participants, for example, through an Online Certificate Status Protocol (OCSP). In an exemplary embodiment, the CA further provides information according to a Certificate Revocation List (CRL). The OCSP is an Internet protocol for obtaining a revocation status of an X.509 digital certificate, and is sometimes considered to be an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

The exemplary embodiments described further below therefore leverage DNS SEC and digital ledgers/blockchains, both of which are existing conventional technologies, but according to an innovative solution that advantageously enables a distributed PKI ecosystem that is more significantly dynamic conventional mechanisms. That is, conventional mechanisms that depend on DNSSEC use of DNSSEC only for specific use cases. Such conventional mechanisms do not allow bootstrapping or a building a trusted set of Root CAs using a consensus model. The conventional systems also do not provide for cryptographic verification on a digital ledger or blockchain. According to the innovative systems and methods described herein though, ecosystem participants are able to dynamically discover "trusted" Roots, and therefore avoid the need for a central root CA.

In an exemplary operation, a CA issues PKI certificates and public keys to the ecosystem participants. The CA receives OCSP request messages from the ecosystem participants and confirms the revocation status of a corresponding certificate (e.g., stored in the trusted database of the CA), and the OCSP responder of the CA transmits an OCSP response message indicating the revocation status (e.g., "valid," "revoked," "unknown," etc., or an error message if the request message may not be processed). In the exemplary embodiment, the CA generates or records the issuance of the public/private keypairs. In some embodiments, the CA further optionally generates and/or records the certificates associated with the keypairs.

In an exemplary embodiment, a certificate issuance infrastructure of the CA is configured such that each organization/domain of the PKI ecosystem hosts autonomous CAs, and issues certificates for that particular organization/domain. Public keys of the autonomous CAs may then be published by the organization/domain in a DNSSEC-enabled DNS record for that organization/domain. In some embodiments, specifics of the DNS record are determined at a later time. In exemplary operation, each organization/domain publishes or records the public key of its CA on a public blockchain, and the resulting transaction will be viewable as having an unspent condition, and include the domain to which the certificate is tied, as entered in the organization/domain DNSSEC entry. This double-reference mechanism provides a greater depth to the integrity of the registration, and makes subverting the trust system secondly more difficult. Accordingly, unlike conventional PKI keys that are typically considered to be long-lived (i.e., 50 years or longer), the keys generated according to the present techniques may be relatively short-lived, e.g., in the order of months or a few years.

From a blockchain perspective, the first time a CA certificate is submitted to the blockchain, it is submitted as a genesis transaction (e.g., which may then be flagged in the transaction as "Type: Genesis" and is entered as being both from and to the same issuer). The Genesis transaction may then be spent in two ways (resulting in subsequent transactions): (i) by issuing a new transaction that references the transaction ID from the previous transaction, which is a method of CA certificate renewal (the new transaction being accordingly flagged as "Type: Renewal", and also to and from the same issuer); and (ii) by generating a revoke transaction (e.g., flagged as "Type:Revoke", also to and from the issuer, and disallowing subsequent renewals). In some embodiments, the security of the renewal and revocation transactions are further improved by prompting the owning issuer to delete the associated private keys. In additional embodiments, security is still further improved by, when certificates expire, prompting the owning issuer two renew or revoke the associated transaction as well.

As described further below with respect to FIG. 1, two separate steps may be performed for certificate validation: (1) for genesis transactions, the submitting certificate issuer must be verifiable as owning the referenced DNSSEC domain; and (2) for renewal and revocation transactions, the transaction must also be verifiable as being unspent. In the case of CA certificate renewal, each CA certificate may be reflected as an unspent transaction on the blockchain. An issuer may renew a CA certificate such that it replaces the relevant expiring certificate. Similar to conventional techniques, an issuer utilizing the present systems and methods may reuse the same private key for the new certificate or create a new private/public keypair, depending on the specific use case.

In exemplary operation, once an organization/domain has its public key published, the organization/domain is unable to issue certificates to endpoints by signing the certificates with the corresponding private key. In some embodiments, the certificate issuance mechanism may implement conventional protocols (e.g., ACME, etc.). In other embodiments, certificates are issued to endpoints during manufacturing (e.g., in the case where the certificate is included on a manufactured device or product).

FIG. 1 is a sequence diagram for an exemplary PKI ecosystem 100. In the exemplary embodiment, ecosystem 100 includes a first organization 102 (ORG-A), a first entity 104 (ENT-A), DNS SEC 106, a blockchain 108, a second organization 110 (ORG-B), a third organization 112 (ORG-E), and a second entity 114 (ENT-E). As described herein, the term "organization" refers to a computing device and/or computer system for the respective ecosystem participant, and which includes at least one processor and at least one memory and/or electronic storage device. In exemplary operation, ecosystem 100 is configured such that the respective participants thereof may execute one or more of a first organization subprocess 116, a second organization subprocess 118, and a third organization subprocess 120, which may implement the following steps, respectively, which are not necessarily required to be in the order listed, except where so clearly designated as being dependent on a prior step.

First organization subprocess 116 begins at step S122, in which a public/private keypair is created by or ORG-A 102 for a first domain name. In step S124, ORG-A 102 registers a first domain name (e.g., "<ORG-A>.com" and creates a CA (not shown) in DNSSEC 106. In step S126, ORG-A 102 registers the CA in blockchain 108. In step S128, the registered CA transaction in blockchain 108 results in an unspent transaction being created in blockchain 108. In step S130, ORG-A 102 creates a certificate for ENT-A 104 using the CA created in DNSSEC 106 and registered in blockchain 108. In at least one embodiment of step S130, the created certificate is registered on one or both of DNSSEC 106 and blockchain 108. In step S132, ORG-A 102 asserts, to ORG-B 110, trust in entity A 104 based on DNSSEC 106, the public/private keys, and blockchain 108 based on the respective CA and certificate registrations therein. In the exemplary embodiment, the substance of first organization subprocess 116 is performed by ORG-A 102, except for general operation of the digital ledger of blockchain 108.

Second organization subprocess 118 begins at step S134, in which ORG-B 110 confirms and/or validates the certificate registered in DNSSEC 106. In at least one embodiment of step S134, second organization subprocess 118 will register a failure if ORG-B 110 cannot or does not confirm or validate the DNSSEC registration of the certificate. In step S136, ORG-B 110 confirms or validates the registration of the CA on blockchain 108. In at least one embodiment of step S136, second organization subprocess 118 will register a failure if ORG-B 110 cannot or does not confirm or validate the blockchain registration of the CA. In step S138, ORG-B 110 confirms that the entity certification (i.e., of ENT-A 104) has not been revoked for the first domain name CRL or OCSP. In the exemplary embodiment, the substance of second organization subprocess 118 is performed by ORG-B 110.

Third organization subprocess 120 begins at step S140, in which a public/private keypair is created by ORG-E 112 (e.g., for the first domain name). In step S142, ORG-E 112 attempts to register the first domain name in DNSSEC 106. In an exemplary embodiment of step S142, the attempt by ORG-E 112 to register the first domain name fails in the case where ORG-E 112 does not have DNSSEC permission to register the domain name. In step S144, ORG-E 112 also or alternatively attempts to register the CA of ORG-A 102 on blockchain 108. In an exemplary embodiment of step S144, the attempt by ORG-E 112 to register the CA fails in the case where a validity check in blockchain 108 (e.g., by the distributed ledger) confirms that the existing DNSSEC entry of the CA (e.g., by ORG-A 102). In step S146, ORG-E 112 creates a certificate for ENT-E 114. In step S148, ENT-E 114 (or alternatively, ORG-E 112) attempts to assert trust, to ORG-B 110, in ENT-E 114. In the exemplary embodiment, the substance of steps S140 through S148 are performed by ORG-E 112.

In step S150, ORG-B 110 queries blockchain 108 regarding the attempt, in step S148, to assert trust in EN's T-E 114. In an exemplary embodiment of step S150, the query of blockchain 108 determines that ENT-E 114 has not registered, or is not tied to, the certificate (or CA) in blockchain 108. In step S152, ORG-B 110 similarly checks DNSSEC 106 regarding the trust asserted by ENT-E 114 in step S148. In an exemplary embodiment of step S152, the DNSSEC check determines that ENT-E 114 has not registered, or is not tied to, the certificate (or CA) in DNS SEC. In some embodiments, steps S150 and S152 may be performed in the opposite order, or simultaneously. Accordingly, ecosystem 100 registers, at step S148', the failure of ORG-E 112 (or ENT-E 114) to assert trust in ENT-E 114 with ORG-B 110, because ENT-E 114 (certificate or CA) is not registered in either DNS SEC 106 or blockchain 108.

In a further exemplary embodiment ecosystem 100, a significantly improved, high-performance blockchain resolver advantageously provides DNSSEC entry, a block height, a transaction, and a hash for each transaction of ecosystem 100. In at least one other embodiment, CA governance exists between the CAs and DNSSEC. In an exemplary embodiment, CA governance is of particular significance with respect to revocation of certificates, which is discussed further below with respect to FIG. 2.

Figure 2:
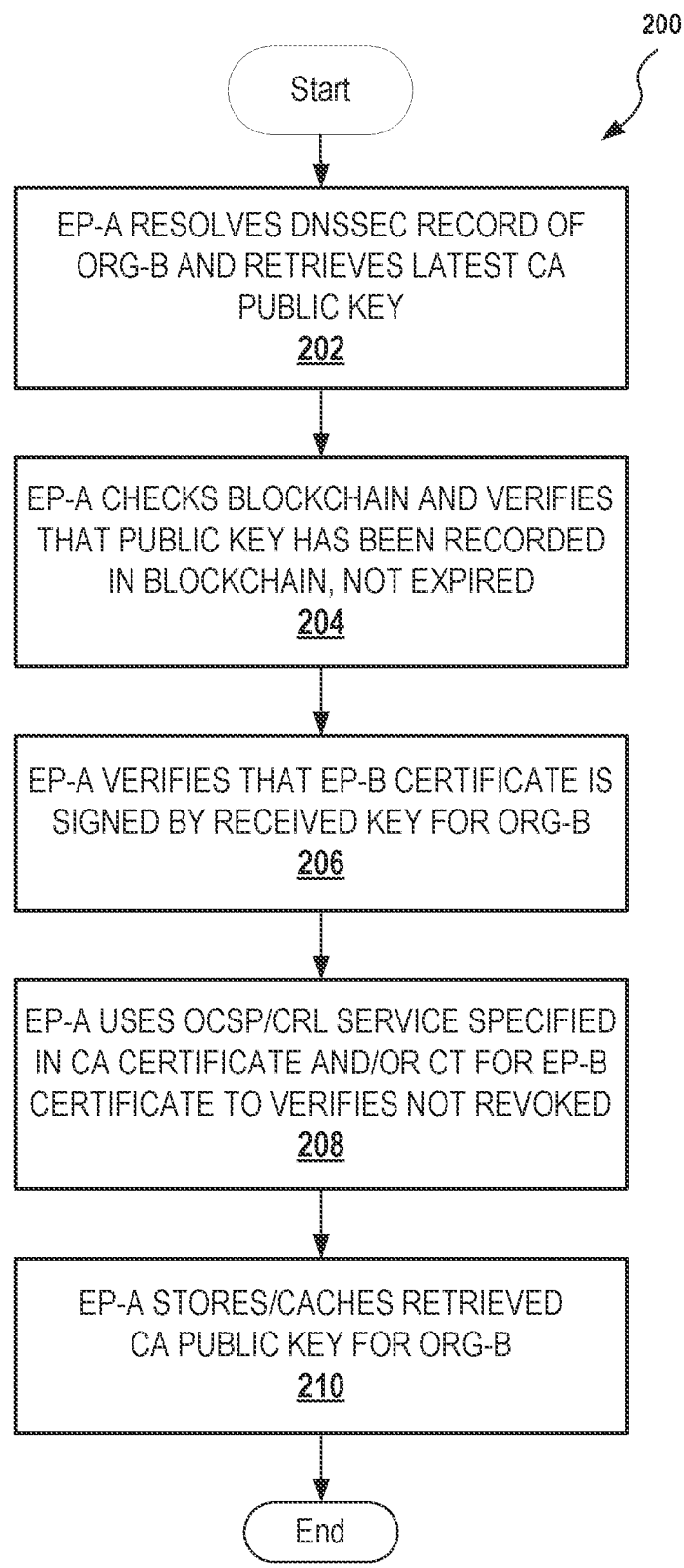
FIG. 2 is a flow chart diagram of an exemplary certificate verification process that may be implemented with the ecosystem depicted in FIG. 1.

FIG. 2 is a flow chart diagram of an exemplary certificate verification process 200 that may be implemented with ecosystem 100, FIG. 1, and with all or portions of one or more of the embodiments described herein. In the exemplary embodiment, process 200 is implemented when a first endpoint (EP-A, not shown in FIG. 2) holding a certificate from a first organization (e.g., ORG-A 102, FIG. 1) seeks to authenticate or verify the certificate of another endpoint (EP-B, not shown in FIG. 2) holding a certificate from a second organization (e.g., ORG-B 110, FIG. 1). In the exemplary embodiment, process 200 is implemented by EP-A with respect to DNSSEC (e.g., DNSSEC 106, FIG. 1) and a digital ledger (e.g., blockchain 108, FIG. 1).

In exemplary operation, process 200 begins at step 202. In step 202, EP-A resolves the DNSSEC record of ORG-B and retrieves the latest, i.e., most recent, CA public key of ORG-B. In step 204, EP-A checks or queries the digital ledger and verifies that the public key has been recorded in the digital ledger, and that public key has not expired. In step 206, EP-A verifies that the certificate presented by EP-B is signed by the retrieved latest public key for ORG-B. In step 208, EP-A utilizes a OCSP/CRL service specified in the CA certificate (e.g., retrieved from the digital ledger). Alternatively, or additionally, EP-A utilizes CT for the actual certificate of EP-B to verify that the certificate has not been revoked. In step 210, EP-A stores or caches the public key, which advantageously enables EP-A to retrieve the stored/cached public key and avoid repeating the process 200 in order to verify every certificate.

According to the advantageous techniques of process 200, and as discussed above, individual certificates may be checked for revocation by checking against an OCSP/CRL provided by the CA in the distributed ledger/blockchain, and additionally/alternatively by using CT. If there is a need to revoke a whole set of certificates, e.g., due to a compromise of the CA key, the organization or domain seeking to revoke its own compromised key can simply generate a new key, register that key in the DNSSEC record, submit the new key in the ledger/blockchain, and reference the old/revoked key in the new transaction. By publishing a new key in the ledger/blockchain with a revocation entry for the old key, any certificates that have been signed with the old key will be considered revoked by checking the ledger. According to the innovative mechanism of process 200, an endpoint seeking to execute the verification steps therein may determine, at step 204, that a new key has been recorded in the ledger/blockchain, and also that, if a certificate is being presented that is signed with the old key, the certificate with of the old key should be rejected.

Process 200 therefore provides a PKI ecosystem (e.g., ecosystem 100, FIG. 1) a significantly improved mechanism for an endpoint (e.g., EP-A) to verify certificates. According to the mechanisms of process 200, when EP-A holds a certificate from a first organization (e.g., ORG-A 102, FIG. 1), and seeks to authenticate or verify the certificate of another endpoint (e.g., EP-B, which holds a certificate from a second organization, e.g., ORG-B 110, FIG. 1), the ecosystem is configured such that EP-A is enable to: (i) resolve the DNSSEC record of the second organization and retrieve the latest CA public key; (ii) check the blockchain to verify that the public key has been recorded and has not expired; (iii) verify that the certificate presented by EP-B is signed by the retrieved latest public key for the second organization; (iv) use an OCSP/CRL service specified in the CA certificate, and/or CT for the EP-B certificate, to determine that the certificate has not been revoked; and (v) store/cache the retrieved public key so that EP-A is not required to repeat process 200 in every instance.

The embodiments described above therefore further provide a significantly improved certificate revocation mechanism. Whereas revocation of long-lived end-entity certificates may be performed according to conventional techniques (thereby allowing OCSP/CRL), revocation of CA certificates is performed herein to also allow short lived end-entity certificates to be issued and revoked. Revocation of these CA certificates may be implemented by: (i) revoking ownership of a DNSSEC domain, thereby effectively revoking all CA certificates for an entity; and/or (ii) for an entity seeking to revoke one of its CA certificates, by submitting a revocation transaction according to the processes described above with respect to FIGS. 1 and 2.

According to these techniques, blockchain participants are enabled to register public "distrust" of a particular certificate. In most cases, however, it may still be the decision of the certificate user as to whether or not to accept certificates registered with a public "distrust." In the exemplary embodiment, "distrust" is an additional type of blockchain transaction, and the distrust transaction will be entered onto the blockchain as being between the distrusting party and the owner of the certificate, and include the transaction ID of the certificate that is being distrusted.

Exemplary embodiments of PKI management systems and methods are described above in detail, as well as particular embodiments relating to certificate verification mechanisms that do not require a priori set up of root CAs with the PKI ecosystem. The systems and methods of this disclosure though, are not limited to only the specific embodiments described herein, but rather, the components and/or steps of their implementation may be utilized independently and separately from other components and/or steps described herein.

The innovative systems and methods described herein advantageously provide an improved utilization of DNSSEC, the blockchain, and the cryptographic validation mechanisms to allow a global assertion and retrieval of a trust issuer. In exemplary embodiments the global assertion and retrieval of the trust issuer is performed algebraically. The implementation of the novel blockchain resolver, in addition to the spent and unspent blockchain transactions with respect to certificates, further provides a significantly improved performance of certificate validation in comparison with conventional cryptographic validation methods. The present techniques also eliminate the need for a bridge and or Root CA to establish trust a priori. The architecture of the ecosystems described herein support short-lived CA certificates, and also implement double-referencing/cross-referencing between the DNS SEC entry and the corresponding blockchain transactions and blocks. Such extra security depth provides greatly improves the integrity of the trust system, while also rendering subversion of the trust system significantly more difficult.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the respective processor to perform at least a portion of the methods described herein. The above examples are exemplary only, and thus are not intended to limit in any way the definition and/or meaning of the term "processor."

This written description uses examples to disclose the embodiments, including the best mode, and to enable a person skilled in the art to practice the embodiments, by making/using/performing the disclosed devices, systems, and methods. The patentable scope of the disclosure is defined by the claims, and may include other examples that may occur to those skilled in the art. Such examples are intended to be within the scope of the claims if they have structural elements that do not differ from the literal language of the claims, or if they include equivalent structural elements with insubstantial differences from the literal language of the claims.

What is claimed is:

1. A first computer device for trust-based system, the first computer device in operable communication with a second computer device different from the first computer device, a digital ledger, and an index, the first computer device comprising:
    a first processor; and
    a first memory configured to store first instructions therein, which, when executed by the first processor, cause the first processor to:
        create at least one first public/private keypair for a first domain name;
        in the index, register the first domain name and create a trust server;
        register the trust server in the digital ledger;
        using the trust server, create a first credential for a first entity;
        register the first credential in at least one of the digital ledger and the index as a registered first credential; and
        assert, to the second computer device, trust in the first entity based on the registered first credential,
    wherein the registered first credential is accessible to the second computer device for validation of the registered first certificate.

2. The first computer device of claim 1, wherein the digital ledger comprises a blockchain.

3. The first computer device of claim 2, wherein the first instructions further cause the first processor, when registering the trust server record in the digital ledger, to create a genesis transaction in the blockchain.

4. The first computer device of claim 3, wherein the genesis transaction is registered in the blockchain as being unspent.

5. The first computer device of claim 3, wherein the first instructions further cause the processor to spend the genesis transaction by one of issuing a new transaction and generating a revoke transaction.

6. The first computer device of claim 5, wherein the issuing of a new transaction (i) is formed to and from the same issuer, and (ii) references a transaction ID from a previous transaction.

7. The first computer device of claim 5, wherein the generated revoke transaction (i) is formed to and from the same issuer, and (ii) functions to disallow subsequent renewal transactions.

8. The first computer device of claim 2, wherein the asserted trust in the first entity is further based upon validation of one or more of the first public/private keypair, the index, and the blockchain.

9. The first computer device of claim 2,
    wherein the first instructions further cause the first processor to enable a third computer device, different from the first and second computer devices, to (i) create at least one second public/private keypair for the first domain name, (ii) attempt to register on the blockchain at least one of the first domain name in the index and the trust server, (iii) create a second credential for a second entity, and (iv) attempt to assert, to the second computer device, trust in the second entity based on the registered second credential.

10. The first computer device of claim 9, wherein the first instructions further cause the first processor to enable the second computer device to (i) query the blockchain regarding the attempted second entity trust assertion and (ii) check with the index regarding the second entity trust assertion.

11. The first computer device of claim 10, wherein the first instructions further cause the first processor to enable the second computer device to determine that the second entity has not registered or is not tied to the registered first trust server.

12. The first computer device of claim 11, wherein the first instructions further cause the first processor to enable the second computer device to register, on the blockchain, a public distrust of the second credential.

13. The first computer device of claim 10, wherein the first instructions further cause the first processor to enable the second computer device to determine that the second entity has not registered, or is not tied to, the registered first credential.

14. The first computer device of claim 13, wherein the first instructions further cause the first processor to enable the second computer device to register, on the blockchain, a public distrust of the second credential.

15. The first computer device of claim 1, wherein the first instructions further cause the first processor to enable the second computer device to (i) validate the registered first credential in one or more of the index and the blockchain, and (ii) confirm that a credential for the first entity has not been revoked.

16. The first computer device of claim 15, wherein the credential is a certificate.

17. The first computer device of claim 16, wherein
the confirmation that the first entity credential has not been revoked is performed through an online certificate status protocol (OCSP) or according to a certificate revocation list (CRL).

18. The first computer device of claim 1, wherein the index is at least one of a file, a database, a distributed database, a domain name system (DNS) server, and a DNS system security extensions (DNSSEC) server.

19. The first computer device of claim 1, wherein the trust-based system is a public key infrastructure (PKI) ecosystem.

20. The first computer device of claim 1, wherein the trust server is a certificate authority (CA).

* * * * *